United States Patent
Boucher et al.

(10) Patent No.: US 6,622,980 B2
(45) Date of Patent: Sep. 23, 2003

(54) SOCKET AND RAIL CLAMP APPARATUS

(75) Inventors: Michael M. Boucher, Ashburnham, MA (US); Kip P. VanSteenburg, Sudbury, MA (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 09/814,148

(22) Filed: Mar. 21, 2001

(65) Prior Publication Data

US 2002/0061225 A1 May 23, 2002

Related U.S. Application Data

(60) Provisional application No. 60/192,555, filed on Mar. 28, 2000.

(51) Int. Cl.⁷ .................................................. E04G 3/00
(52) U.S. Cl. .............. 248/231.51; 248/286; 248/287.1; 403/260; 403/257
(58) Field of Search .................... 248/231.51, 227.2, 248/227.4, 228.4, 230.4, 316.5, 292.12, 229.13, 286.1, 218.4, 229.11, 54, 296.1, 540, 228.2, 287.1, 298.1; 5/658; 403/260, 257

(56) References Cited

U.S. PATENT DOCUMENTS

| | | | |
|---|---|---|---|
| 2,913,740 A | 11/1959 | Eldridge | |
| 2,935,286 A | 5/1960 | Parsons | |
| 3,046,072 A | * 7/1962 | Douglass, Jr. et al. | 311/10 |
| 3,286,283 A | 11/1966 | Bertoldo | |
| 3,530,515 A | 9/1970 | Jacoby | |
| 4,018,412 A | * 4/1977 | Kees, Jr. et al. | 248/214 |
| 4,143,652 A | * 3/1979 | Meier et al. | 128/20 |
| 4,147,257 A | * 4/1979 | Zippel | 211/45 |
| 4,355,631 A | * 10/1982 | LeVahn | 128/20 |
| 4,487,523 A | 12/1984 | Monroe | |
| 4,616,797 A | 10/1986 | Cramer | |
| 4,729,138 A | 3/1988 | Heyman et al. | |
| 4,729,535 A | 3/1988 | Frazier et al. | |
| 4,796,846 A | * 1/1989 | Meier et al. | 248/286 |
| 4,852,840 A | * 8/1989 | Marks | 248/230 |
| 4,901,963 A | * 2/1990 | Yoder | 248/231.5 |
| 4,901,964 A | 2/1990 | McConnell | |
| 5,121,892 A | 6/1992 | Herzog | |
| 5,320,444 A | 6/1994 | Bookwalter et al. | |
| 5,355,539 A | 10/1994 | Boettger | |
| 5,400,772 A | 3/1995 | LeVahn et al. | |
| 5,538,215 A | * 7/1996 | Hosey | 248/286.1 |
| 5,662,591 A | * 9/1997 | Peindl et al. | 601/24 |
| 5,701,991 A | 12/1997 | Helmetsie | |
| 5,735,499 A | * 4/1998 | Phillips et al. | 248/230.1 |
| 5,741,210 A | * 4/1998 | Dobrovolny | 600/227 |
| 5,802,636 A | 9/1998 | Corbin et al. | |
| 5,836,026 A | 11/1998 | Reed | |
| 5,836,559 A | * 11/1998 | Ronci | 248/230.3 |

\* cited by examiner

*Primary Examiner*—Kimberly Wood
(74) *Attorney, Agent, or Firm*—Barnes & Thornburg

(57) ABSTRACT

An apparatus for securing a surgical accessory to a rail of a patient support device includes a clamp and a socket assembly. The clamp includes a first jaw and a second jaw coupled to the first jaw for movement between a first position in which the apparatus is attachable to and detachable from the rail and a second position in which the second jaw cooperates with the first jaw to grip the rail. The second jaw is biased toward the second position. The socket assembly includes a plurality of components movable between a loosened configuration and a tightened configuration. The second jaw is locked in the second position in response to movement of the plurality of components to the tightened configuration.

38 Claims, 9 Drawing Sheets

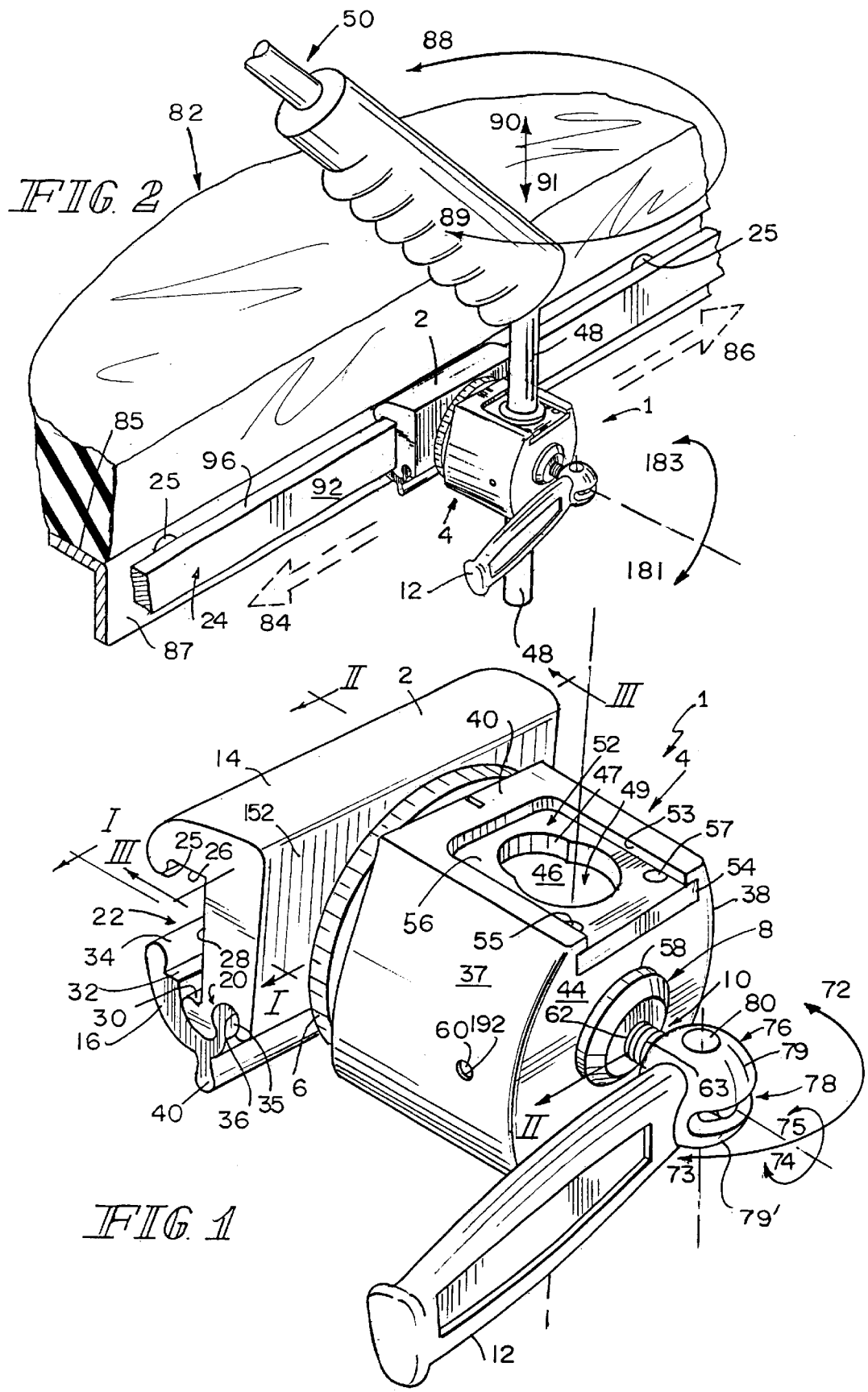

US 6,622,980 B2

SOCKET AND RAIL CLAMP APPARATUS

RELATED APPLICATION

The present disclosure is based upon U.S. Provisional Application Ser. No. 60/192,555, filed on Mar. 28, 2000, the complete disclosure of which is hereby expressly incorporated by reference.

BACKGROUND AND SUMMARY

The present invention relates to a clamp configured to attach to a rail. More particularly, the present invention relates to a clamp configured to attach to the rail with a single arcuate force and includes a socket configured to receive a hospital accessory.

The use of a socket and clamp to hold a hospital accessory to a rail on the side of a hospital bed is known. For example, a conventional clamp is "C"-shaped with jaws that pivot or otherwise move with respect to each other to fit about the rail. Often these clamps include a threaded pin extending therethrough that tightens against the rail. A socket is attached to the clamp having some type of receiver configured to accept the hospital accessory. A second threaded pin is often provided, extending into the receiver to tighten the hospital accessory against same.

These and other types of clamps have proven cumbersome for users to attach to the rail easily because of the several operations required. The conventional clamp requires a first motion to open the jaws. The open jaws are then fitted about the rail. Another operation requires a threaded screw or other locking mechanism to engage and secure the clamp to the rail. In a still further operation, the accessory is received into the clamp or socket portion. Finally, a separate threaded pin or other locking mechanism is required to engage and secure the accessory in place.

Because the hospital environment can be fast paced, the ability to provide a patient with various apparatus in a short period of time may become critical. Many of the conventional rail clamps take so long and are too cumbersome to attach to a hospital accessory and may cost a nurse or doctor vital seconds that would otherwise be needed to tend to a patient. It would be beneficial, therefore, to provide a clamp which comprises a socket to receive a hospital accessory, and which secures to a bed rail in an insubstantial amount of time and with a minimum of effort.

Accordingly, the present invention provides a socket and clamp apparatus for securing a device to a rail using a single actuation force and using a minimum of operations. The apparatus comprises a first jaw, a second jaw, a body, and a member. At least one of the jaws is movable relative to the other jaw between an open position for receiving a rail and a closed position gripping the rail. In one embodiment, the second jaw is coupled to the first jaw for movement between first and second positions. In the first position, the apparatus is attachable to and detachable from the rail. In the second position, the second jaw cooperates with the first jaw to grip the rail. The body is coupled to either the first or second jaw. The body is also configured to support the device. The member is movable relative to the first and second jaws between release and lock positions. In the release position, the second jaw is movable between the first and second positions. In contrast, in the lock position, the second jaw is secured in the second position.

The socket and rail clamp apparatus may provide a socket assembly that is adapted to receive a portion of a surgical accessory. The socket assembly comprises a plurality of components that are movable between loosened and tightened configurations. In the loosened configuration, the second jaw is movable between first and second positions. In the tightened configuration, the second jaw is locked in the second position.

The socket and rail clamp apparatus may also provide a coupling member and a first lock. The coupling member is configured to couple the body to the clamp. The first lock is configured to secure the clamp about the rail and the body in position relative to the clamp.

The socket and rail clamp apparatus may further provide a resilient member coupled to the member engaging the second jaw. The member can be spaced apart from the rail when in the release position, and engaging the rail when in the locked position. In addition, the second jaw can be biased toward the second position relative to the first jaw. Further, the second jaw can be configured to "snap automatically" onto a second portion of the rail during attachment of the apparatus to the rail.

The second jaw may be coupled to the first jaw for pivoting movement about an axis. To accomplish this, the first jaw includes a socket that engages a cylindrical portion on the second jaw. The cylindrical portion cooperates with the socket to define the axis about which the second jaw pivots relative to the first jaw, moving same between the release and locked positions.

A method for coupling a socket and rail clamp apparatus to the rail of a hospital bed may still further be provided. The first step comprises providing a clamp having upper and lower jaw members. The lower jaw member is movable relative to the upper jaw member. Second, a rail is provided having first and second side walls and upper and lower edges. Third, the upper jaw member is placed adjacent the upper edge, and the lower jaw member adjacent the lower edge. Fourth, a first force is applied on the upper jaw member against the upper edge, and a moment force is placed on the lower jaw member against the first side wall. This causes the lower jaw member to move adjacent the lower rail edge. Finally, a second force is applied against the upper jaw member, causing same to move adjacent the second side wall and move the lower jaw member also adjacent the second side wall.

BRIEF DESCRIPTION OF THE DRAWINGS

The present invention will be described hereinafter with reference to the attached drawings which are given as non-limiting examples only, in which:

FIG. 1 is a perspective view of a socket and rail clamp assembly;

FIG. 2 is a perspective view of the socket and rail clamp assembly of FIG. 1 with a surgical accessory attached and secured to the rail of a hospital bed;

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE DRAWINGS

Figure 3:
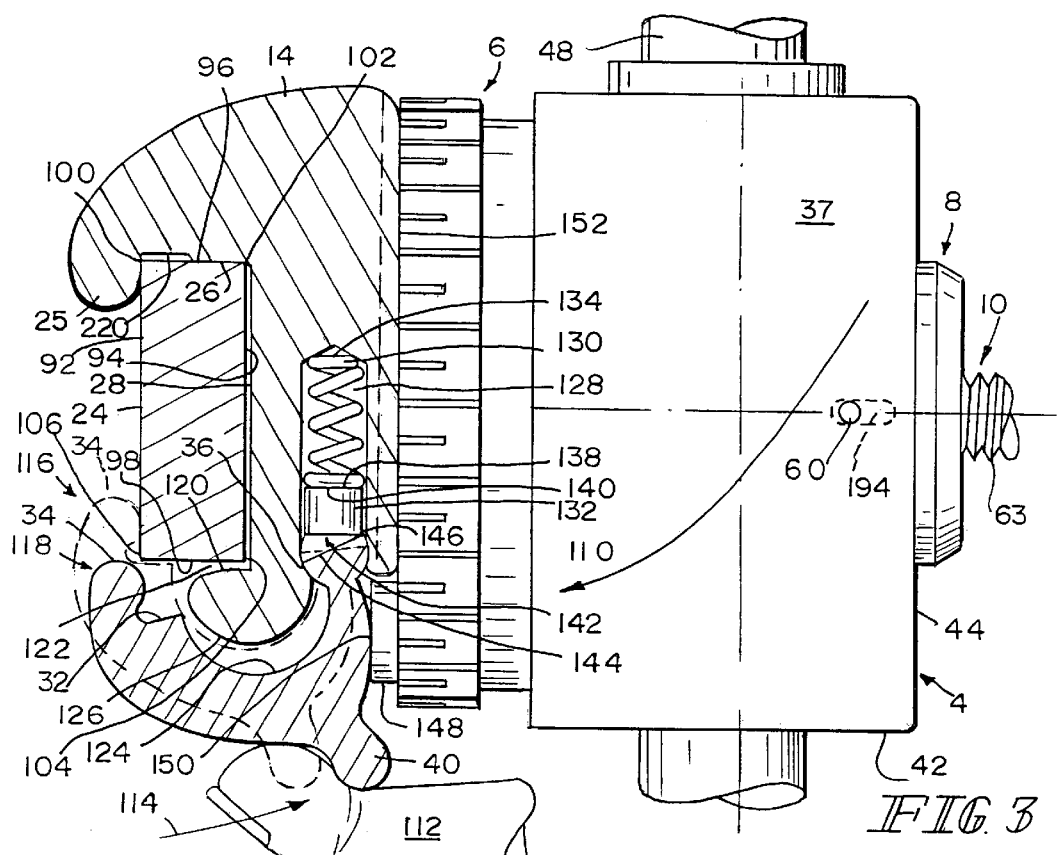
FIG. 3 is a partial cross-section view of the socket and rail clamp assembly of FIG. 1 along the line of I—I.

The present invention is directed to a socket and rail clamp assembly for attachment to any portion of a hospital bed rail. A user attaches the socket and rail clamp assembly to the rail with a single motion. The user then secures or locks the clamp to the rail with a subsequent motion.

In the illustrated embodiment, FIG. 1 shows a socket and rail clamp assembly 1 including a clamp 2, a body 4, a lock 6, a coupling member 8, a locking pin 10, and a handle 12. Clamp 2 includes an upper jaw member 14 and a lower jaw member 16 movable relative to upper jaw member 14 at joint 20. An open space 22 is defined by upper tip 25, top face 26, front face 28, and lower face 30 of upper jaw member 14, and by step 32 and lower tip 34 of lower jaw member 16. In addition, open space 22 is sized to receive a rail 24. (See FIGS. 2–7.) Joint 20 is defined by a cylinder 35 running the length of lower jaw member 16 positioned within a socket 36. A trigger portion 40 is provided on lower jaw member 16 for the user to engage to pivot lower jaw member 16 relative to upper jaw member 14. Body 4 is adjacent lock 6 which is adjacent clamp 2. Body 4 is defined by two side walls 37, 38, and top and bottom walls 40, 42 extending therebetween. (See also FIG. 3.) As shown in FIG. 1, walls 37, 38 are convex-shaped surfaces. An end wall 44 is provided on coplanar edge of walls 36, 38, 40, 42. A bore 46 is disposed through body 4 to receive a post 48 of a surgical accessory 50. As shown, bore 46 is comprised of longitudinally-intersecting bores 47, 49 having different diameters. This allows, for example, bore 46 to receive and support surgical or other hospital accessory posts of different diameters. In the illustrated embodiment, top wall 40 includes a recess 52 defined by a lip 53 and a groove 54. A reinforcing member 56 is sized to be received within grove 54. To further strengthen member 56 with respect to body 4, dowels 55, 57 can be extended from member 56 to body 4. Bore 46 also extends through reinforcing member 56, forming an opening.

A coupling member 8 extends through a bore 58 disposed through body 4 transverse to bore 46. (See also FIG. 4.) Coupling member 8 is shown as a cylindrical pin that extends from clamp 2 through body 4, movably coupling said components via pin 60, as will be discussed hereinafter. (See FIG. 6.) As shown in FIGS. 3–7, coupling member 8 has a bore 70 disposed therethrough in coaxial alignment with bore 46 in body 4. This allows post 48 to extend in through bore 46 at wall 40, through coupling member 8, and out bore 46 at bottom wall 42. A locking pin 10 extends through a bore 62 disposed through coupling member 8, as will be discussed hereinafter. (See FIGS. 3–5.) As shown, locking pin 10 is threaded to engage bore 62. By turning pin 10 in direction 74 or 75, pin 10 will either be extended into or out of coupling member 8 to engage or disengage post 48. A handle 12 for pin 10 is rotatable in directions indicated by reference numerals 72, 73, 74 and 75 to allow the user to operate the handle at almost any angle relative to locking pin 10. This is accomplished by end 76 of handle 12 providing a channel 78 within which a portion of locking pin 10 is received. A fastener 80 extends through the first half 79 of end 76 and through pin 10 to the second half 79' of end 76.

As shown in FIG. 2, socket and rail clamp assembly 1 is attached to rail 24 of a surgical table 82. In the illustrated embodiment, the portion of surgical table 82 shown comprises a mattress 83 resting adjacent top surface 85 of a base 87. Rail 24 is attached to pins 25 extending from base 87. Assembly 1 is shown to be movable along rail 24 by directional arrows 84, 86. Also shown in FIG. 2 is the direction of motion of post 48 in the horizontal and vertical planes indicated by reference numerals 88, 90, respectively. By turning handle 12 in direction 75, for example, locking pin 10 will disengage from post 48, allowing same to move in directions 88-91. Once accessory 50 is in the desired position, turning handle 12 in direction 74 will cause locking pin 10 to engage post 48, thereby securing same in the desired position. An additional range of motion is available to surgical accessory 50 by rotation of body 4 in directions 181 and 183, as will be discussed further hereinafter.

Coupling and securing rail clamp assembly 1 to rail 24 is shown in FIGS. 3–11. Rail 24 includes two longitudinally-oriented side walls 92, 94, and top and bottom edges 96, 98 extending therebetween at edges 100, 102, 104, 106. With assistance of the rounded profile of tip 25, placing tip 25 over corner 100 allows edge 100 to slide along tip 25 seating within the open space 22 of upper jaw member 14. By applying a force in direction 110 and using finger 112 to apply a force against trigger 40 in direction 114 moves lower jaw member 16 from a closed position 116, indicated by broken lines, to an open position 118, indicated by solid lines. In open position 118, space 22 will be large enough to receive rail 24 such that top and bottom edges 96, 94, 98 are positioned adjacent faces 26, 28, 32. Upper jaw member 14 includes a guide tab 120 appended generally perpendicular to face 28 opposite top face 26. Tab face 122 is a slightly stepped structure positioned lower than face 30 on lower jaw member 16, serving as a guide when lower jaw member 16 is in the open position 118. In the illustrated embodiment, tab face 122 does not engage bottom edge 98 of rail 24 when member 16 is in closed position 116. Bottom edge 98 is, in fact, engaged by surface 32 when lower jaw member 16 is in closed position 116. (See also FIG. 11.)

An arcuate surface 124 is provided on lower jaw member 16 between surface 32 and cylinder 35, as shown in FIG. 3. A surface 126, corresponding to convex surface 124, is provided opposite surface 122 on guide tab 120 and extending to socket 36. A pair of chambers 128 are provided within upper jaw member 14, also adjacent socket 36. (See also FIG. 12.) Within each chamber 128 is a spring 130 and an element or spacer 132 to provide a bias force against lower jaw member 16 toward its closed position 116. A first end 134 of spring 130 is positioned against wall 136, and a second end 138 is positioned against a first surface 140 of spacer 132. A notch 142 is formed in cylinder 35 adjacent chamber 128. Notch 142 includes a flat surface 144 recessed in cylinder 35 such that a corner 146 of same applies a force reverse to the bias of spring 136 as lower jaw member 16 is moved in direction 114. A resilient member 148 is attached to first lock 6 and positioned to engage a rear end 150 of lower jaw member 16 which is provided adjacent trigger 40 opposite tip 34. This engagement causes lock 6 to move to a non-adjacent position from the back portion 152 of clamp 2. This movement causes pads 154, provided integral with lock 6, to move inwardly from surface 28, as shown by the broken lines in FIG. 4. Consequently, as clamp 2 is being coupled to rail 24 (i.e., when lower jaw 16 is in open position 118), pads 154 do not provide a securing force against rail 24. This affords rail 24 some range of movement within cavity 22, allowing movement in directions 84, 86 as shown in FIG. 2.

Figure 4:
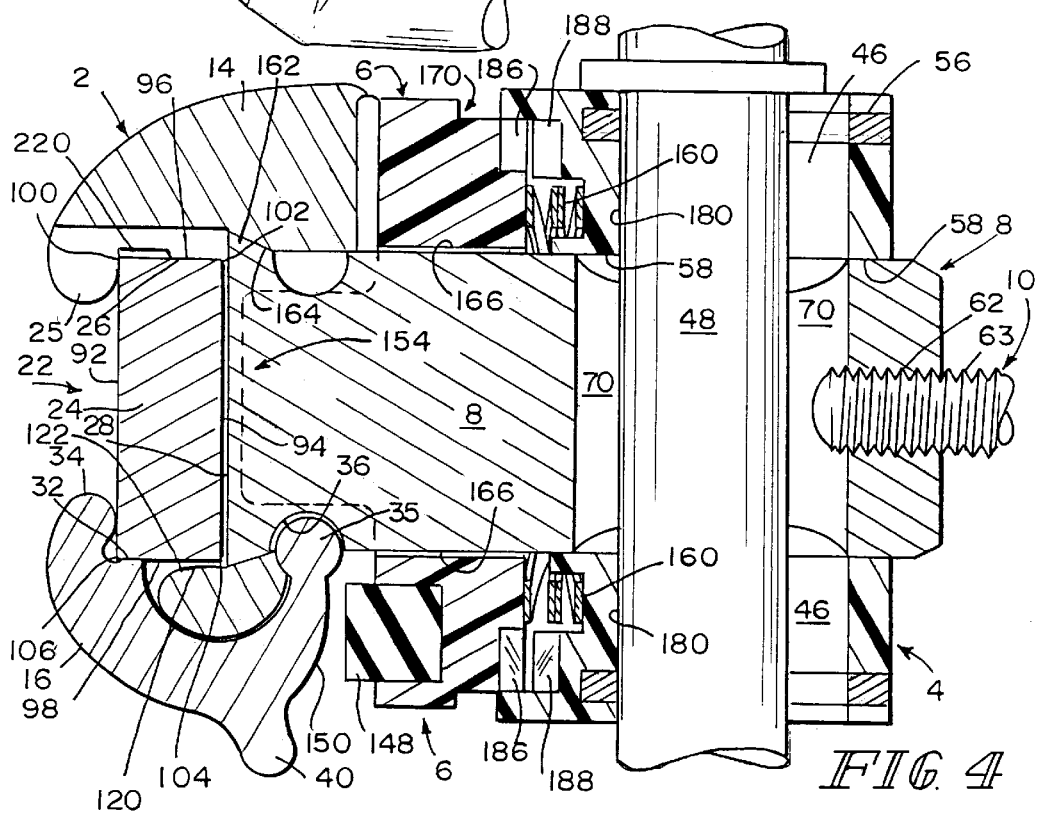
FIG. 4 is a cross-section view of the socket and rail clamp assembly of FIG. 1 along the line of II—II in an unlocked configuration.

Socket and rail clamp assembly 1 coupled to rail 24, but not yet secured to same, is shown in FIG. 4. In this position, as previously discussed, socket and rail clamp assembly 1 can be selectively positioned along rail 24 in direction 84, 86. In addition, pads 154 do not engage wall 94 of rail 24, bias from spring 160 keeps lock 6 and body 4 in their most separated positions, resilient member 148 does not engage lower jaw member 16, post 48 does not engage body 4, and locking pin 10 does not engage post 48. A flange 162 (FIGS. 5 and 12) is disposed about the periphery of coupling member 8 on the side adjacent wall 94 on rail 24. In the illustrated embodiment, flange 162 is beveled and sets in a countersunk portion 164 of clamp 2 so that the end of coupling member 8 forms a portion of surface 28. The cross-section of lock 6 in FIG. 4 shows coupling member 8 extended through a bore 166 disposed coaxially-aligned with bore 58 in body 4. The outer periphery 170 of lock 6 is shown to be a stepped structure configured to be positioned adjacent body 4, as shown in FIG. 4.

Figure 5:
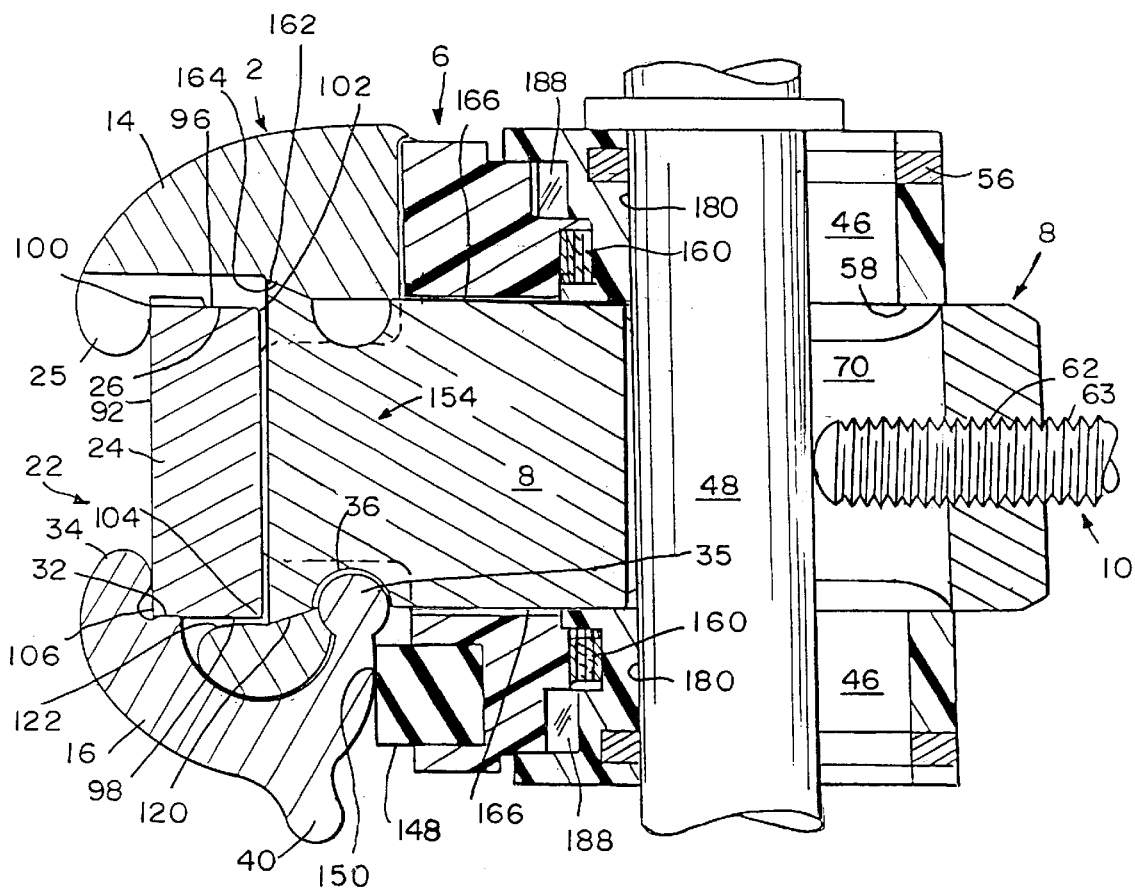
FIG. 5 is another cross-section view of the socket and rail clamp assembly of FIG. 1 along the line of II—II in a locked configuration.

Socket and rail clamp assembly 1 is shown in FIG. 5 securely coupled to rail 24. In this position, socket and rail clamp assembly 1 cannot move along rail 24. Pads 154 engage wall 94 of rail 24 providing the secure coupling. Locking pin 10 is shown extended within bore 70 of coupling member 8 forcing post 48 to engage the wall 180 of bore 58 biasing body 4 against lock 6. As locking pin 10 is forcing post 48 against wall 180, flange 162 is also causing coupling member 8 to draw clamp 2 against lock 6 which in turn draws against body 4. As shown, spring 160 is moved to its most compressed position. All of this applies an increased force on pads 154 against wall 94.

Figure 6:
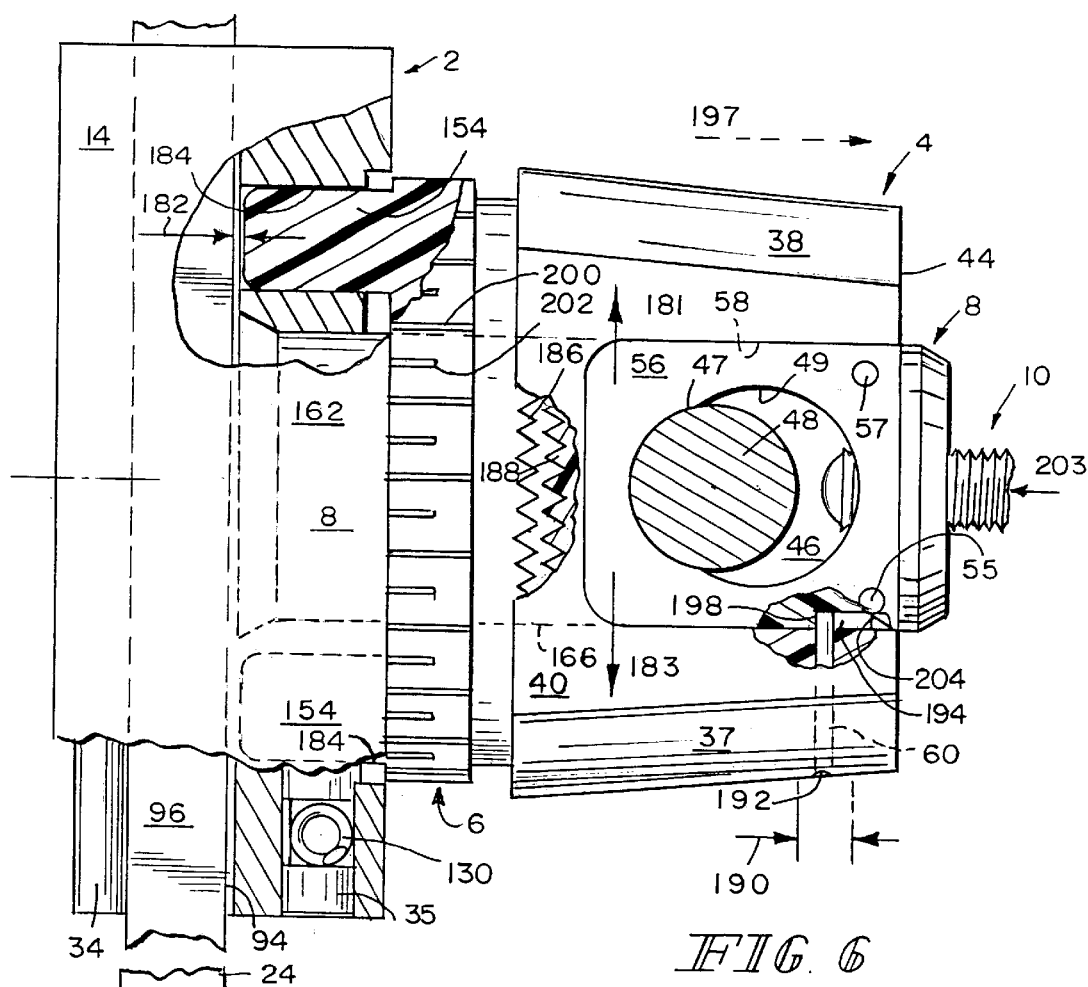
FIG. 6 is a partial cut-away top view of the socket and rail clamp assembly of FIG. 1.
Figure 7:
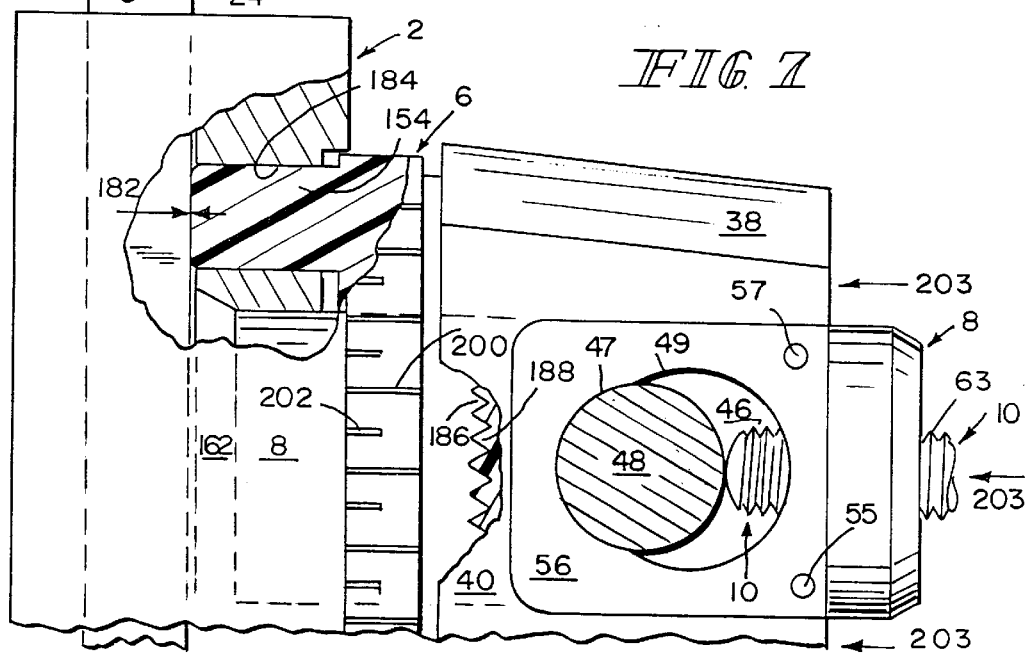
FIG. 7 is another partial cut-away top view of a portion of the socket and rail clamp assembly of FIG. 1.

A partial cut-away top view of socket and rail clamp assembly 1 coupled to rail 24, but not yet secured to same, is shown in FIG. 6. In this position, it is shown that pads 154 maintain a separation from wall 94 of rail 24 indicated by reference numeral 182. Also shown is clamp apertures 184 through which pads 154 extend. When rail clamp assembly 1 is in this position, body 4 can rotate about coupling member 8 in directions 181, 183. In the illustrated embodiment, lock 6 includes a plurality of teeth 186 circumferentially disposed about the top periphery of bore 166. A second plurality of teeth 188 is circumferentially disposed about bore 58 opposite end wall 44. When rail clamp assembly 1 is in the position shown in FIG. 6, teeth 186, 188 are spaced apart sufficiently so as not to engage each other, thereby allowing rotation of body 4 in directions 181, 183. Pin 60 is extended through bore 192 which is transversely disposed into bore 58 of body 4. A slot 194 is formed in the periphery of coupling member 8 adjacent bore 192. Slot 194 extends along the longitudinal axis of coupling member 8, defining the allowable range of movement of body 4 relative to lock 6 a distance 190. It is appreciated that distance 190 is adequate such that as body 4 moves in direction 197, first end 198 of slot 194 is adjacent pin 60, teeth 186 and 188 do not engage. This allows body 4 to rotate freely in directions 181, 183, as previously discussed. Compare to FIG. 7 showing teeth 186 and 188 engaged. Here body 4 is prevented from rotating, securing same to a fixed and secured position. Graduation marks 200, 202 are provided on the periphery of lock 6 to assist the user in determining how much to rotate body 4 in either direction 181. 183.

Another partial cut-away top view of socket and rail clamp assembly 1 coupled to rail 24 and secured to same is shown in FIG. 7. As locking pin 10 moves in direction 202 into coupling member 8, it engages post 48 which in turn engages wall 180 of bore 58. This causes body 4 to move in direction 203 as well, thereby causing body 4 to position adjacent lock 6 and teeth 186, 188 to engage same. Body 4 can move in direction 203 up to point pin 60 which is positioned adjacent second end 204 in slot 194. The bias from body 4 against lock 6 causes pad 154 to engage rail 24, forcing same against tips 25, 34 of jaw members 14, 16, respectively, closing space 182, and securing rail 24 to clamp 2.

Figure 8:
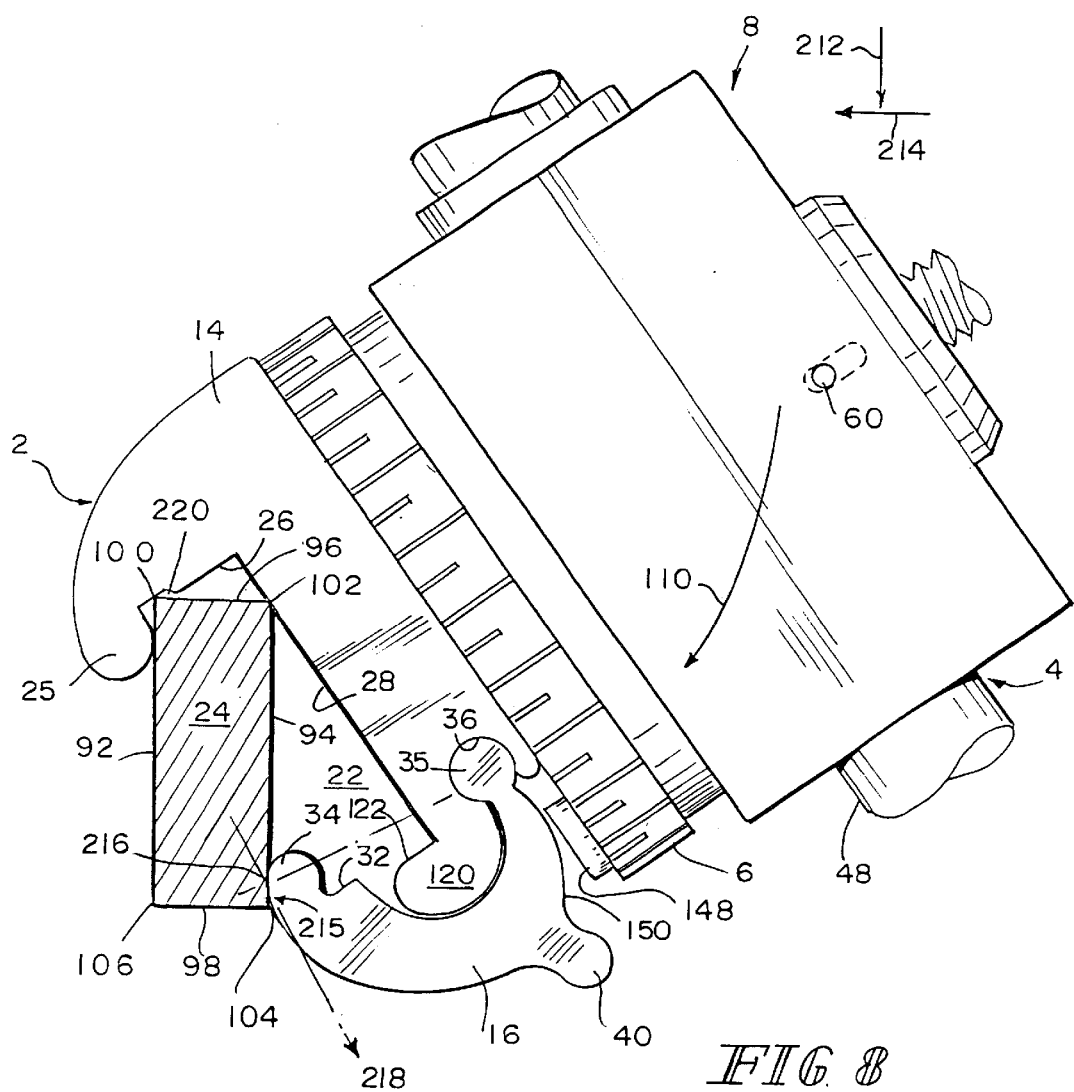
FIG. 8 is a right-side elevation view of the socket and rail clamp assembly of FIG. 1 in an initially coupled position.

The illustrated method of coupling socket and rail clamp assembly 1 to rail 24 is shown in FIGS. 8–11. In FIG. 8, tip 25 is positioned adjacent side wall 92, receiving rail 24 into space 22. Edge 100 is received in a cleft 220 provided adjacent top surface 26 and tip 25. Tip 25 is arcuate, making it easier for rail 24 to move into space 22 as the user applies a force in directions 212, 214. Lower tip 34 of lower jaw 16 is positioned adjacent side wall 94. The application of these two forces creates a moment 215 on lower tip 34, applied at about point 216 where tip 34 is adjacent side wall 94. Moment 215 causes cylinder 35 to serve as a fulcrum, rotating lower jaw member 16, thereby causing tip 34 to move tangent 218 to the moment force 215.

Figure 9:
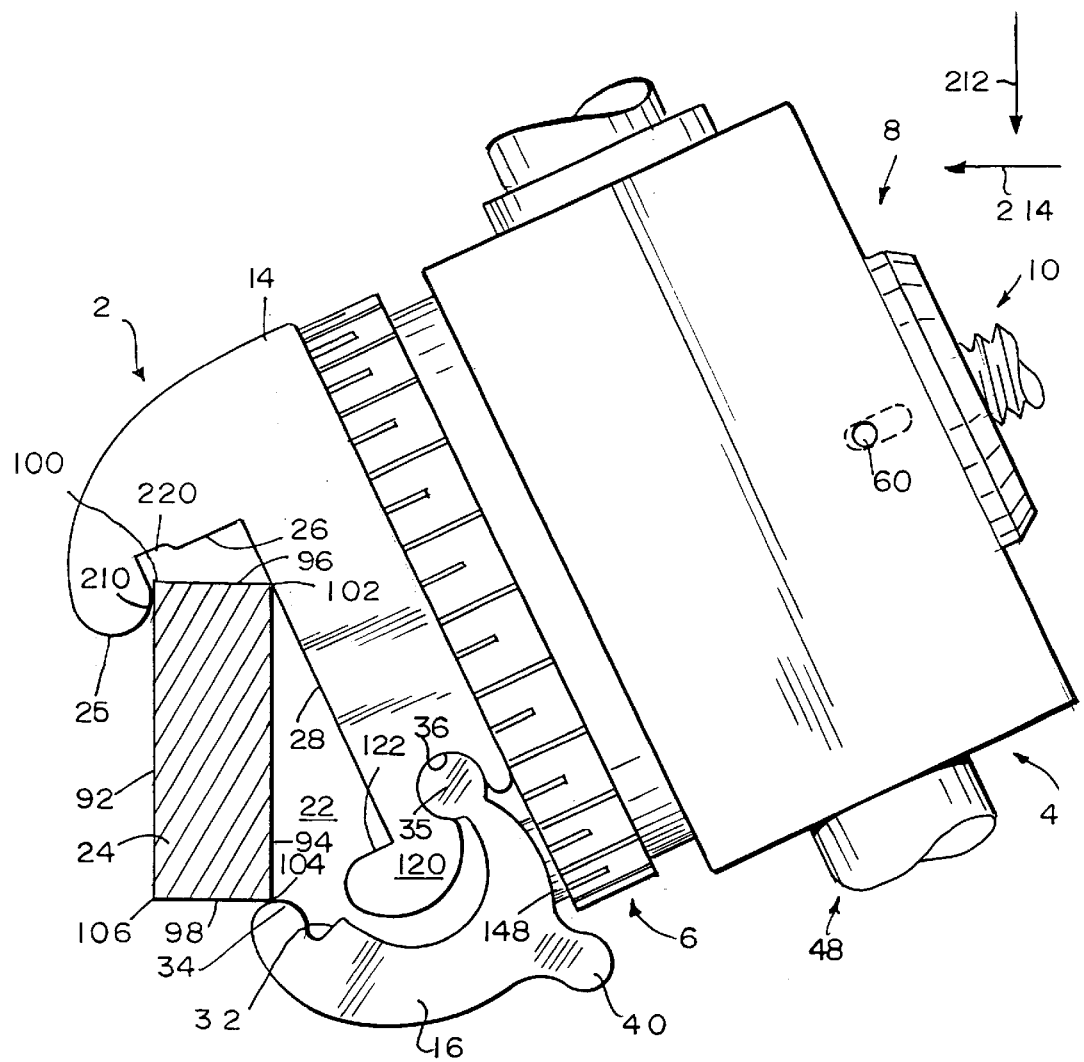
FIG. 9 is a right-side elevation view of the socket and rail clamp assembly of FIG. 1 in a progressively coupled position.
Figure 10:
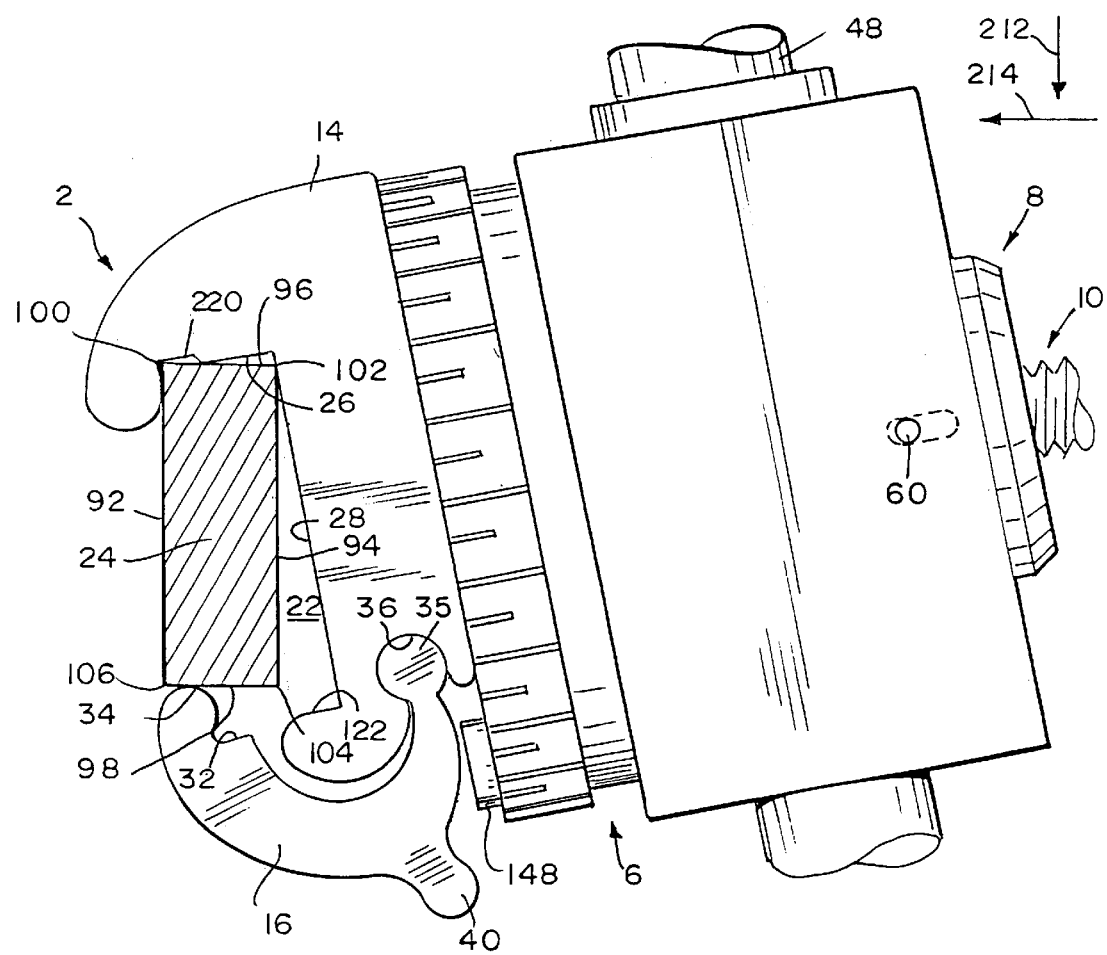
FIG. 10 is a right-side elevation view of the socket and rail clamp assembly of FIG. 1 in a further progressively coupled position.
Figure 11:
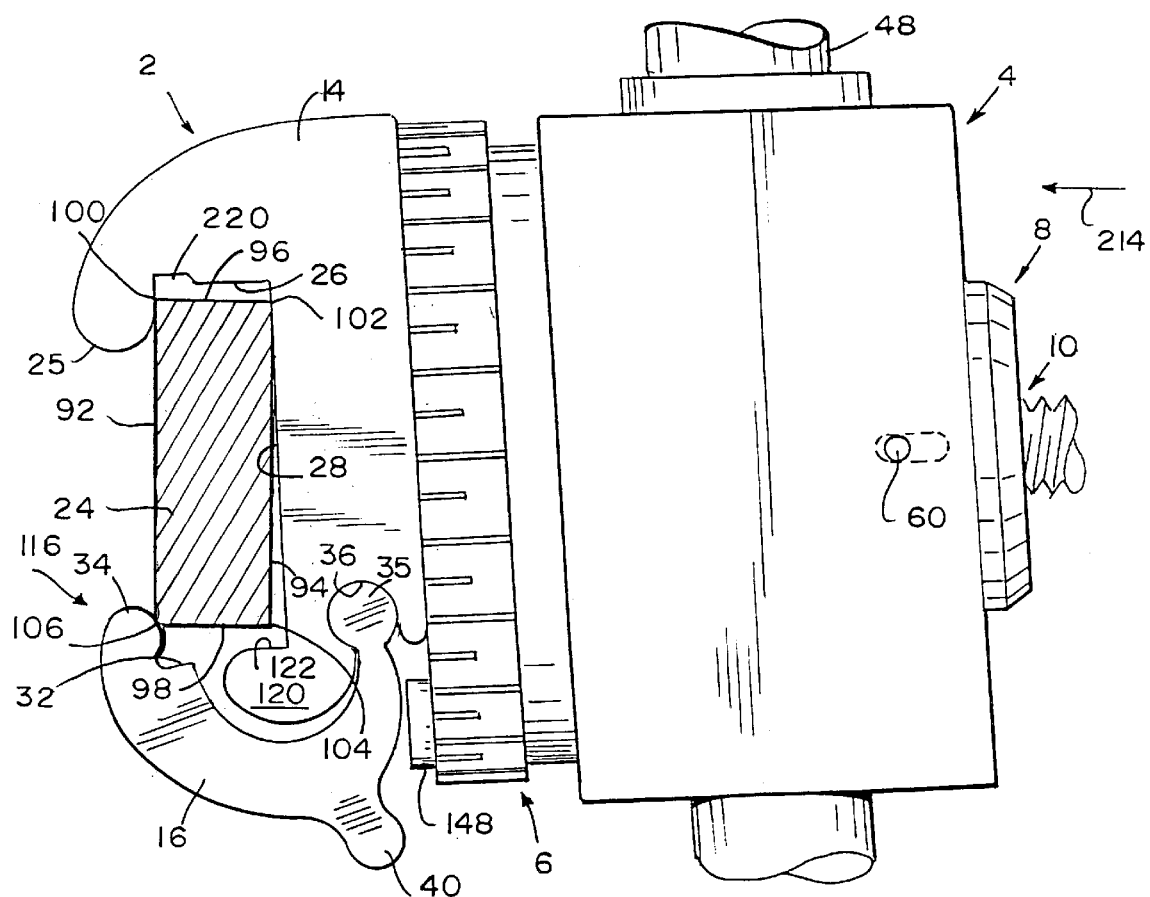
FIG. 11 is a right-side elevation view of the socket and rail clamp assembly of FIG. 1 in a fully coupled position.

As moment force 215 causes lower jaw member 16 to move to a more open position, tip 34 moves from wall 94 to edge 104, as shown in FIG. 9. Consequently, space 22 becomes sized to receive rail 22. Tip 25 is still adjacent side wall 92. Corner 102 engages surface 28 moving along same. (Compare relative positions of edge 102 in FIGS. 9 and 10.) Resilient member 148 engages rear end 150 maintaining a bias force on lower jaw member 16 against rail 24. It is appreciated that component vertical and horizontal forces 212, 214, respectively, will maintain moment force 215 and the continual rotation of lower jaw member 16 along tangent 218. As tip 34 contacts edge 104, the horizontal force will cause tip 34 to move adjacent end wall 98, as shown in FIG. 10. Continual applied force 212, 214 causes both tips 25, 34 to move adjacent side wall 92, thereby placing clamp 2 in the coupled position with respect to rail 24. It will be appreciated that lower jaw 126 snaps automatically around rail 24.

Figure 12:
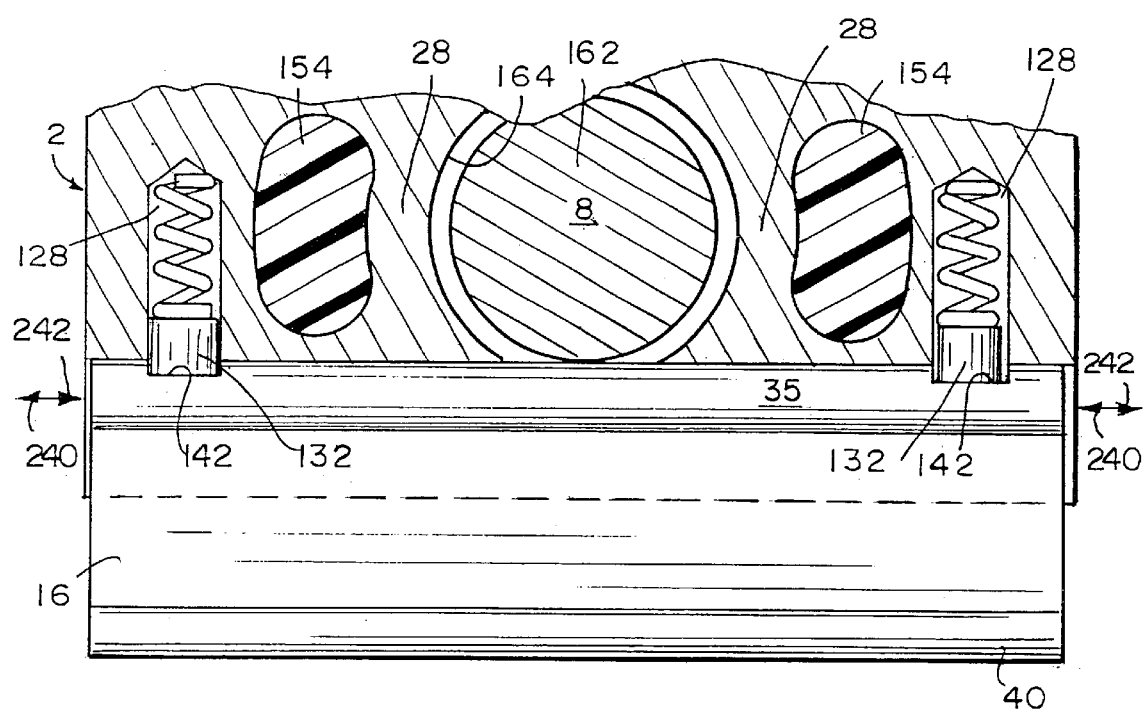
FIG. 12 is a front cross-section view of the socket and rail clamp assembly of FIG. 1 along the line of III—III.

A front cross-sectional view of clamp 2 is shown in FIG. 12. Flange 162 of coupling member 8 is positioned within countersunk portion 164 disposed through wall 28 of clamp 2. Pads 154 are shown on opposed sides of coupling member 8, also extending through wall 28. As previously discussed, pads 154 provide a gripping force against rail 24 when selectively securing clamp 2 to same. In addition, chambers 128 are provided within upper jaw member 14 on opposed sides of coupling member 8. Notches 142 formed in cylinder 35 in cooperation with spacers 132 prevent lower jaw member 16 from moving laterally in directions 240, 242. This prevents lower jaw 16 from possibly separating from clamp 2.

It is appreciated that jaw members 14 and 16 may be of any size and have any width sufficient to effectively couple to any variety of bed rail. It is also appreciated that the socket and rail clamp apparatus can be made from any suitable material or variety of suitable materials, including plastic or metal. Furthermore, the clamp may be sized to attach over notches (not shown) often present in conventional rails. This is in contrast to prior art clamps that are required to be coupled to the rail and then moved past the notches to secure to the rail. In addition, the materials used may allow the socket and rail clamp apparatus to be autoclavable to ensure sterility in a hospital environment.

Although the present invention has been described with reference to particular means, materials, and embodiments, from the foregoing description, one skilled in the art can easily ascertain the essential characteristics of the present invention and various changes and modifications can be made to adapt the various uses and characteristics without departing from the spirit and scope of the present invention as set forth in the attached claims.

What is claimed is:

1. An apparatus for securing a device to a rail, the apparatus comprising:
    a first jaw;
    a second jaw coupled to the first jaw for movement between a first position in which the apparatus is attachable to and detachable from the rail, and a second position in which the second jaw cooperates with the first jaw to grip the rail; the second jaw being biased toward the second position relative to the first jaw;
    a body coupled to at least one of the first jaw and the second jaw, the body being configured to support the device; and
    a member movable relative to the first and second jaws between a release position in which the second jaw is movable between the first and second positions, and a lock position engaging the rail in which the second jaw is locked in the second position in response to movement of the member to the lock position.

2. An apparatus for securing a device to a rail, the apparatus comprising:
    a first jaw;
    a second jaw coupled to the first jaw for movement between a first position in which the apparatus is attachable to and detachable from the rail, and a second position in which the second jaw cooperates with the first jaw to grip the rail;
    a body coupled to at least one of the first jaw and the second jaw, the body being configured to support the device; and
    a member movable relative to the first and second jaws between a release position in which the second jaw is movable between the first and second positions and a lock position in which the second jaw is locked in the second position, the member being spaced apart from the rail when in the release position, and the member engaging the rail when in the lock position.

3. The apparatus of claim 1, wherein the first jaw is configured to hook onto a first portion of the rail, and the second jaw is configured to snap automatically onto a second portion of the rail during attachment of the apparatus to the rail.

4. The apparatus of claim 1, wherein the second jaw is coupled to the first jaw for pivoting movement about an axis generally parallel to the rail.

5. An apparatus for securing a device to a rail, the apparatus comprising:
    a first jaw;
    a second jaw coupled to the first jaw for movement between a first position in which the apparatus is attachable to and detachable from the rail, and a second position in which the second jaw cooperates with the first jaw to grip the rail;
    a body coupled to at least one of the first jaw and the second jaw, the body being configured to support the device; and
    a member movable relative to the first and second jaws between a release position in which the second jaw is movable between the first and second positions and a lock position in which the second jaw is locked in the second position, the second jaw being coupled to the first jaw for pivoting movement about an axis generally parallel to the rail, the first jaw further comprising a socket, the second jaw further comprising a cylindrical portion that is received in the socket, and the cylindrical portion cooperating with the socket to define the axis about which the second jaw pivots relative to the first jaw.

6. The apparatus of claim 5, wherein the cylindrical portion further comprises a notch, the first jaw further comprises a cavity aligned with the notch, and further comprising an element having a first portion received in the notch and a second portion received in the cavity to prevent the second jaw from being separable from the first jaw along the axis.

7. The apparatus of claim 5, wherein the cylindrical portion further comprises a notch having a flat portion, wherein the first jaw further comprises a cavity aligned with the notch, further comprising a spring received in the cavity, and further comprising an element biased by the spring into contact with the flat portion such that the second jaw is biased toward the second position relative to the first jaw.

8. The apparatus of claim 1, wherein the member is spaced apart from the second jaw when the member is moved to the release position.

9. An apparatus for securing a device to a rail, the apparatus comprising:
    a first jaw;
    a second jaw coupled to the first jaw for movement between a first position in which the apparatus is attachable to and detachable from the rail, and a second position in which the second jaw cooperates with the first jaw to grip the rail;
    a body coupled to at least one of the first jaw and the second jaw, the body being configured to support the device;
    a member movable relative to the first and second jaws between a release position in which the second jaw is movable between the first and second positions and a lock position in which the second jaw is locked in the second position, the member being spaced apart from the second jaw; and
    a resilient member coupled to the member and engaging the second jaw when the member is in the lock position.

10. The apparatus of claim 8, wherein the member slides relative to the first jaw during movement between the release position and lock position.

11. The apparatus of claim 1, wherein the second jaw pivots about an axis relative to the first jaw and the member moves along a path orthogonal to the axis during movement between the lock position and the release position.

12. The apparatus of claim 1, wherein the body is formed to include a socket adapted to receive a post of the device.

13. The apparatus of claim 12, further comprising a threaded shaft supported with respect to the body and the threaded shaft being rotatable to force the post of the device against the body, to force the body against the member, and to force the member into the lock position.

14. An apparatus for securing a surgical accessory to a rail of a patient support device, the apparatus comprising:
    a clamp including a first jaw and a second jaw coupled to the first jaw, one of the jaws being movable relative to the other jaw between a first position in which the apparatus is attachable to and detachable from the rail, and a second position in which the one jaw cooperates with the other jaw to grip the rail; the one jaw being biased toward the second position relative to the other jaw; and a socket assembly including a plurality of components, at least one of the plurality of components including an accessory socket adapted to receive a portion of the surgical accessory, the plurality of components being movable between a loosened configuration and a tightened configuration, the one jaw being locked in the second position in response to movement of the plurality of components to the tightened configuration.

15. The apparatus of claim 14, wherein the plurality of components includes a member that is spaced apart from the rail when the plurality of components is in the loosened configuration, and that engages the rail when in the plurality of components is in the tightened configuration.

16. The apparatus of claim 14, wherein the second jaw is movable relative to the first jaw and is biased toward the second position.

17. The apparatus of claim 16, wherein the first jaw is configured to hook onto a first portion of the rail, and the second jaw is configured to snap automatically onto a second portion of the rail during attachment of the apparatus to the rail.

18. The apparatus of claim 14, wherein the second jaw is coupled to the first jaw for pivoting movement about an axis.

19. The apparatus of claim 18, wherein the first jaw further comprises a jaw socket, the second jaw is formed to include a cylindrical portion that is received in the jaw socket, and the cylindrical portion cooperates with the jaw socket to define the axis about which the second jaw pivots relative to the first jaw.

20. The apparatus of claim 19, wherein the cylindrical portion further comprises a notch, the first jaw further comprises a cavity aligned with the notch, and an element having a first portion received in the notch and a second portion received in the cavity to prevent the second jaw from being separable from the first jaw along the axis.

21. The apparatus of claim 19, wherein the cylindrical portion further comprises a notch having a flat, wherein the first jaw further comprises a cavity aligned with the notch, further comprising a spring received in the cavity, and further comprising an element biased by the spring into contact with the flat such that the second jaw is biased toward the second position relative to the first jaw.

22. The apparatus of claim 14, wherein the second jaw pivots about an axis relative to the first jaw, and the plurality of components comprises a member that moves along a path orthogonal to the axis during movement of the plurality of components between the loosened configuration and the tightened configuration.

23. An apparatus for clamping an accessory to a rail extending along a patient support, the rail having an outer side, inner side, upper edge and lower edge, the apparatus comprising:

a clamp having an upper jaw for engaging the upper edge and a lower jaw for engaging the lower edge, at least one of the jaws being movable relative to the other jaw between an open position for placing the clamp on the rail and a closed position for engaging the rail;

a body to which the accessory is attached;

a coupling member configured to couple the body to the clamp; and a first lock configured to secure the clamp about the rail and the body in position relative to the clamp, at least one of the jaws being biased toward the closed position.

24. The apparatus of claim 23, wherein the coupling member rotatably couples the body to the clamp.

25. The apparatus of claim 23, further comprising a biasing member biasing the clamp to the closed position.

26. The apparatus of claim 23, wherein the body is a molded plastic form.

27. The apparatus of claim 23, wherein the body further comprises a first bore for receiving the accessory.

28. The apparatus of claim 27, wherein the body further comprises a second bore for receiving said coupling member.

29. The apparatus of claim 28, wherein the coupling member is a pin extending from the clamp into the second bore of the body rotatably securing the body to the clamp.

30. The apparatus of claim 29, wherein the pin has a first bore disposed therethrough coaxially-aligned with the first bore in the body for receiving the accessory.

31. The apparatus of claim 30, wherein the pin has a second bore extending transversely to and intersecting with the first bore.

32. The apparatus of claim 31, comprising a second lock extending through the second bore of the pin for engaging the accessory and securing it to the body, the second lock being configured to move the body to engage the first lock to secure the clamp to the rail.

33. The apparatus of claim 29, wherein the first lock has a bore configured to receive the pin.

34. The apparatus of claim 33, wherein the first lock further comprises a plurality of teeth circumferentially disposed around the bore, wherein said body further comprises a second plurality of teeth circumferentially disposed about the second bore of the body, and wherein the first and second plurality of teeth are configured to engage each other so as to limit rotational movement of the body relative to the first lock.

35. The apparatus of claim 34, further comprising a spring disposed between the body and the first lock to bias the body relative to the first lock.

36. The apparatus of claim 29, further comprising a dowel extending from a portion of the body into an opening on the coupling member.

37. The apparatus of claim 36, wherein the coupling member has an opening defined as an elongated slot to allow limited axial movement of the coupling member relative to the body.

38. An apparatus for clamping an accessory to a rail extending along a patient support, the rail having an outer side, inner side, upper edge and lower edge, the apparatus comprising:

a clamp having an upper jaw for engaging the upper edge and a lower jaw for engaging the lower edge, at least one of the jaws being movable relative to the other jaw between an open position for placing the clamp on the rail and a closed position for engaging the rail;

a body to which the accessory is attached;

a coupling member configured to couple the body to the clamp; and a first lock configured to secure the clamp about the rail and the body in position relative to the clamp, the first lock further comprising at least one pad extending through said clamp to engage said rail to secure the clamp into position on the rail.

* * * * *